United States Patent [19]

James

[11] Patent Number: 4,650,927
[45] Date of Patent: Mar. 17, 1987

[54] PROCESSOR-ASSISTED COMMUNICATION SYSTEM USING TONE-GENERATING TELEPHONES

[75] Inventor: Leland E. James, Raleigh, N.C.

[73] Assignee: International Business Machines Corporation, Armonk, N.Y.

[21] Appl. No.: 676,139

[22] Filed: Nov. 29, 1984

[51] Int. Cl.$^4$ ............................................ H04M 11/00
[52] U.S. Cl. ...................................... 379/96; 379/52; 379/76; 379/88; 379/97
[58] Field of Search .................... 179/2 A, 2 DP, 6.11; 340/825.48, 825.74

[56] References Cited

U.S. PATENT DOCUMENTS

| 3,675,513 | 7/1972 | Flanagan et al. | 179/2 DP X |
| 4,088,838 | 5/1978 | Nakata et al. | 179/2 A |
| 4,164,025 | 8/1979 | Dubnowski et al. | |
| 4,427,848 | 1/1984 | Tsakanikas | 179/2 DP |
| 4,489,438 | 12/1984 | Hughes | 179/2 A X |

OTHER PUBLICATIONS

Pavlak et al, "KEYPAC-A Telephone Aid for the Deaf", IEEE Transactions on Communications, vol. COM-27, No. 9, (Sep. 1979), pp. 1366-1371.
Sederholm et al, "Intelligent Telephone", IBM Technical Disclosure Bulletin, vol. 23, No. 9, Feb. 1981; pp. 4006-4008.
Smith et al, "Alphabetic Data Entry via Touch-Tone Pad: A Comment"; Human Factors, vol. 13(2), Apr. 1971, pp. 189-190.
Rabiner et al, "Digital Techniques for Computer Voice Response: Implementations and Applications", Proceedings of the IEEE, vol. 64, No. 4, Apr. 1976, pp. 416-433, see pp. 428, 432.

Primary Examiner—Keith E. George
Attorney, Agent, or Firm—Gerald R. Woods

[57] ABSTRACT

A processor-assisted system helps persons with speech or hearing handicaps communicate with any telephone caller having an ordinary tone generating telephone. With minimal training, the caller can communicate with the handicapped person using a one key per letter technique for spelling out words. Received keypad sequences are decoded by the processor and the decoded message is presented on a video display or monitor. Since there are three alphabetic letters on most of the keys of a tone generating telephone, the decoding process must take into account that more than one word might have been intended by a particular keypad sequence. The decoding process retrieves all possible words and allows the handicapped person to choose the appropriate word from the context of the sentence. According to one decoding process, all words which might be represented by a particular key sequence are stored in records including the keypad sequence. According to another decoding process, a word look-up process of the on-line spell checking type is employed.

13 Claims, 8 Drawing Figures

| TONE | CHARACTER MEANING |
|---|---|
| 1-9 | ALPHABETIC OR NUMERIC |
| 0 | NUMBER 0 OR HELP FLAG |
| ✳ | END OF WORK/SENTENCE FLAG |
| # | NUMERIC OR DELETE FLAG |

PROCESSOR-ASSISTED COMMUNICATION SYSTEM USING TONE-GENERATING TELEPHONES

BACKGROUND OF THE INVENTION

The present invention relates to a communications and more particularly to a processor-assisted system for allowing a handicapped person to more readily communicate with casual or untrained callers having an ordinary tone generating telephone.

Most people can use conventional telephones to communicate easily with others. Unfortunately, people with speech or hearing handicaps cannot, for the most part, make effective use of conventional telephones but must rely on special systems and devices.

One of the earliest systems required that each handicapped person have access to a terminal, such as a Teletype machine. While such systems were clearly useful, they did not have drawbacks. For two people to communicate, both had to have access to such systems and the training to know how to use them. These requirements obviously limited the number of people with whom a handicapped person could communicate.

It has been recognized that tone generating telephones could be used to allow people having such telephones to communicate with handicapped persons. Several techniques have been developed for allowing a telephone user to enter messages through the keypad of a standard tone generating telephone. While the techniques differ in detail, all require that the telephone user press several keys to identify which alphabetic letter he intends on the keypad. As an example, the "2" key on a standard telephone has "ABC" alphabetic characters and the user has to press several keys to indicate whether he intends an "A" or a "B" or a "C".

One of the known ways of doing this requires that the user depress the "1" or the "2" or the "3" key for a relatively long interval to indicate whether he intends the first or second or third alphabetic letter in a set. The user then depresses the key containing the appropriate set of alphabetic characters.

Another known technique requires that the user press the appropriate key one to three times quickly to identify which character on that key is intended.

While these and other known techniques accomplish the desired result of unambiguously identifying the alphabetic character intended if they are performed properly, they can only be used by those persons with some training and skill in the particular technique. Even then the techniques are more cumbersome than is desirable by virtue of the fact that multiple keystrokes are required for each alphabetic character.

SUMMARY OF THE INVENTION

The present invention is a system which uses the power of a small or personal computer to greatly simplify the techniques which a telephone user must employ to communicate with a handicapped person.

The telephone user inputs his message on the keypad of a conventional tone generating telephone on a one key per character basis without worrying about which of several different alphabetic characters on a particular key is intended. Control characters are entered to delimit words and sentences. Received signals are assembled into input units, each representing the word or words that may have been intended for the keypad sequence. On-line memories or databases are used to store words which could be intended. The databases are accessed as a function of the input units to retrieve all words that might have been intended. The decoded words are presented on a video monitor at the handicapped person's location. If more than one word is possible for a particular input unit, the different choices are displayed to allow the handicapped user to decide which word was meant from the context of the sentence.

BRIEF DESCRIPTION OF THE DRAWINGS

While the specification concludes with claims particularly pointing out and distinctly claiming that which is regarded as the present invention, further details of preferred embodiments of the invention may be more readily ascertained from the following technical description when read in conjunction with the accompanying drawings wherein:

TECHNICAL DESCRIPTION

Figure 1:
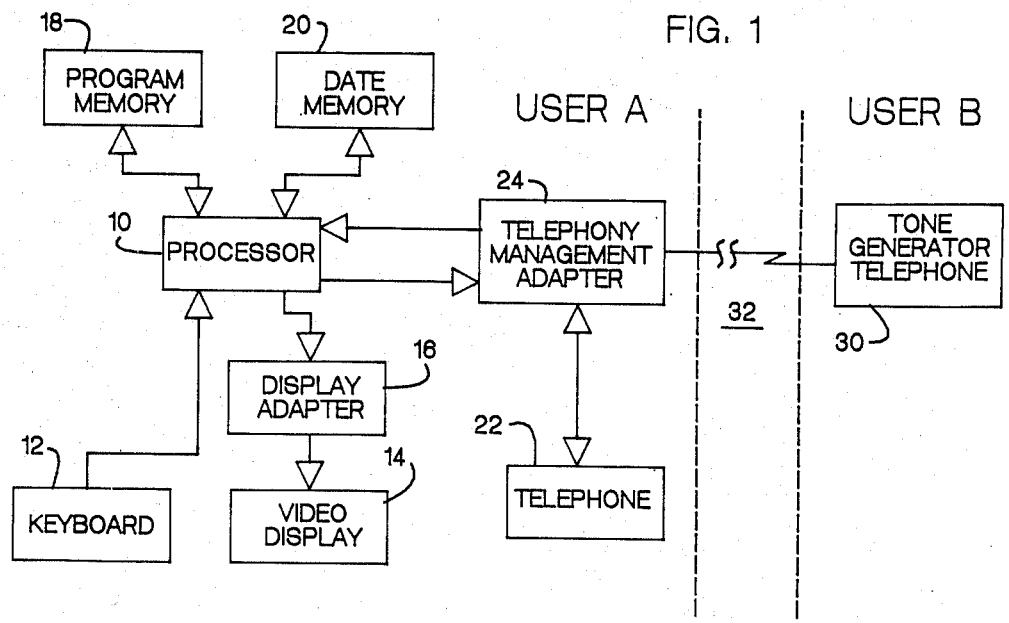
FIG. 1 is a block diagram of a system within which the present invention can be practiced.

Referring to FIG. 1, a system within which the present invention may be practiced includes a processor 10, which is preferably a small general purpose or personal computer. A keyboard 12 is attached to the processor, as is a video display or monitor 16. The monitor 16 is connected to processor 10 through a display adapter 14 which provides appropriate signals for the particular type of monitor used. The processor 10 is connected to program memory 18, which stores the control program required to practice the present invention, and to a data memory 20, which constitutes a database of alphabetic words which might be retrieved through the use of decoding processes to be described later. While the memories 18 and 20 are shown as separate units, they may exist in the same housing as processor 10 in such conventional forms as random access memory or disk storage units. All of the components described are conventional in nature. The programming stored in the program memory 18 and the format of the data stored in data memory 20 in at least one embodiment are unique to the present invention.

A telephony management adapter 24 is attached to the processor 10. The adapter, which may take the form of a free standing unit or a pluggable circuit board for the personal computer, would perform several essentially independent functions. The adapter would provide text to speech conversion, also known as voice synthesis. The same adapter would provide interface functions between the processor 10 and a telephone line. Such functions would include tone detection and conversion from audio form to digital form. A conventional tone generating telephone 22 may be connected to the adapter 24 in such a way that it may be used independently of processor 10.

One commercially available adapter capable of performing the necessary functions is the CallText 5000 multi-function speech peripheral board marketed by SpeechPlus of Mountain View, CA.

The adapter 24 is connected to a switching system 32, such as a PABX or a public switched network, through which it may be linked with any other telephone such as telephone 30. For purposes of the present invention, telephone 30 must be a tone generating telephone or have tone generating capabilities in the form of an attached or even hand-held tone generating device.

A handicapped person would be the user of that portion of the system to the left of the switching system 32. To simplify the following description, any person using this portion of the system may be referred to as user A. Any caller could use a tone generating telephone such as telephone 30. Such a caller may be referred to as user B in the following description.

Figure 2:
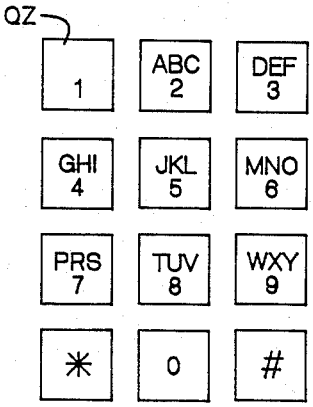
FIG. 2 is a view of the keypad of a typical tone generating telephone showing the location of numeric/alphabetic and control characters.

FIG. 2 shows the keypad of a conventional tone generating telephone. The 2 through 9 keys of the keypad each contains a set of three alphabetic characters, which for the most part, are in normal alphabetic sequence. The two exceptions are that the letters "Q" and "Z" do not appear on the keypad. Since these letters are obviously needed if the keypad is to be used to enter words, the 1 key on the keypad, which lacks any alphabetic characters, can be used to represent either a "Q" or a "Z" alphabetic character.

There are two control keys on a conventional keypad, a "*" key and a "#" key. These two keys, along with the 0 or Operator key under certain conditions, perform control functions. The functions performed by the various keys under different conditions are described briefly with reference to the table shown in FIG. 3.

The 1 through 9 keys may be used to enter alphabetic characters or numbers, depending on whether they are preceded by a control character as described below. The 0 key may be used to enter the number 0 or to invoke a help function, again as described below. The "*" key may be used to delimit input units (words or numbers) or to indicate the end of a sentence. A "#" key can either identify a numeric input unit or be used as a delete key, depending on where it occurs in a sequence of entries.

The basic protocol of data entry is as follows. If user B wants to enter an alphabetic word, he depresses the keys on which the appropriate alphabetic characters appear or, in the case of a "Q" or a "Z", the 1 key. The user depresses only one key per character. The end of a word entry is noted by pressing the "*" key once. The end of a sentence is noted by pressing the "*" key again immediately after an end of word "*" entry. To identify numeric entries, the user presses the "#" key before pressing the appropriate keys in sequence. The end of a numeric entry is indicated in the same way as the end of a word entry, namely by pressing the "*" key once. Complete word or number entries are referred to as input units in the remainder of the description.

The "#" key may also be used to initiate an erase or delete operation, giving the user a chance to correct wrongly entered information in the middle of the sequence. To initiate an erase operation, the user presses the "#" key in the middle of a keypad sequence. Upon detecting this key, the processor erases all keypad entries which have occurred since the last word/sentence delimiting "*" character was received.

The "0" or Operator key may also be used to invoke a help function on the user's command. If this key is pressed in the middle of a keypad sequence, the processor interprets it as a call for help. A set of prerecorded or synthesized oral instructions may be transmitted to the caller.

Figures 3, 4:
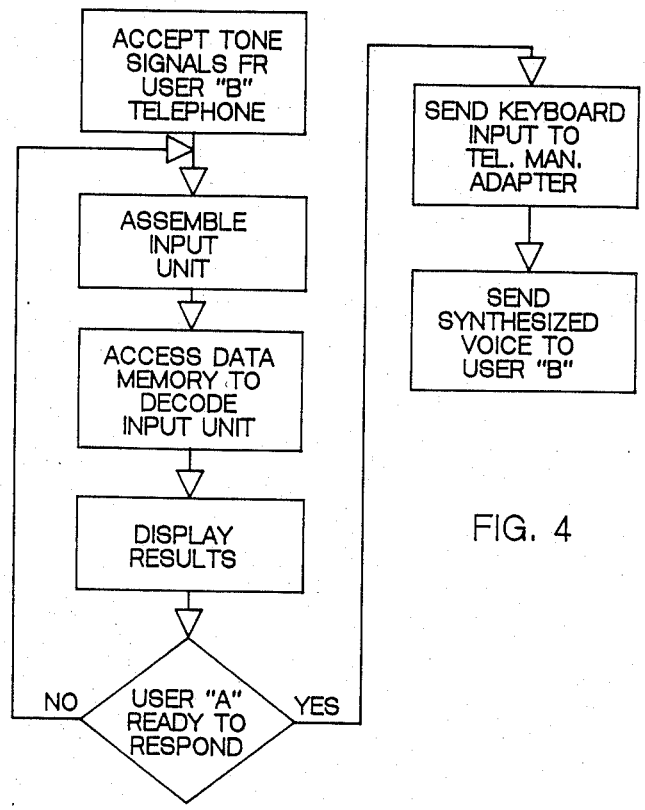
FIG. 3 is a table of the assigned functions of various keys on the keypad for purposes of practicing the present invention.
FIG. 4 is a very basic flow chart of operations that are performed within a system practicing the present invention.

The basic elements of the inventive process performed in the system are described with reference to FIG. 4. It is assumed that the telephone link has been established and that user B knows how to enter words/numbers from his telephone keypad. The processor 10 waits for tone signals to be entered by user B. Of course, processor 10 does not detect actual tones, but rather the tone indicating signals generated in the telephony management adapter 24. When an input unit, defined as a complete word or number sequence, is detected by the presence of the delimiting "*" characters, a data memory is accessed to decode the input unit. The word or words intended by user B are displayed on the display 16. When user A wishes to respond, he types his response at the keyboard 12. The entered signals are transmitted to the adapter 24, which produces the synthesized voice that is heard by user B. Of course, if user A wishes to respond directly, the telephone 22 can be used to bypass the adapter 24.

Figure 5A:
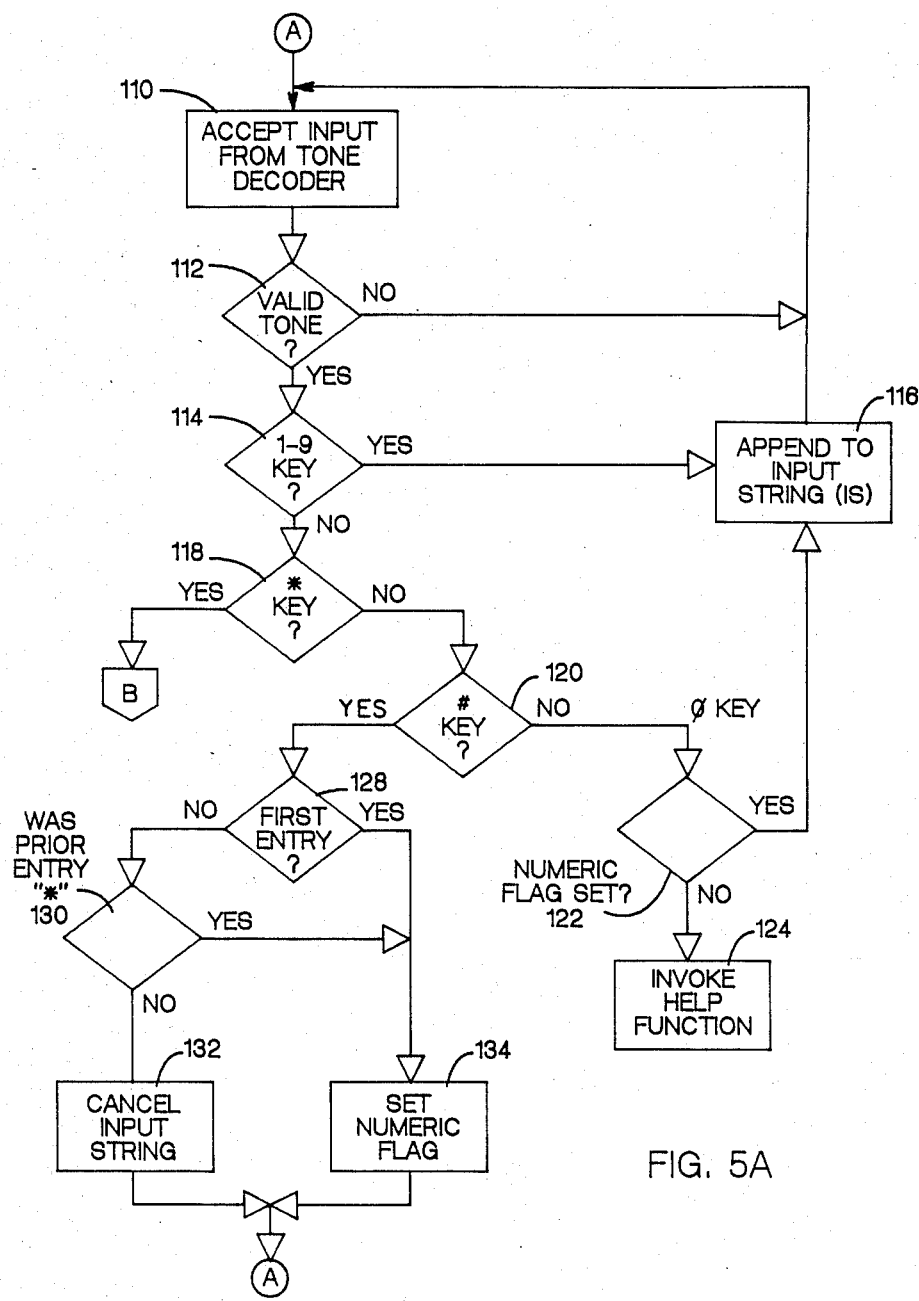
FIG. 5, consisting of FIGS. 5A and 5B taken together, as a flow chart of the data entry/input unit assembly operations in a system practicing the present invention.
Figure 5B:
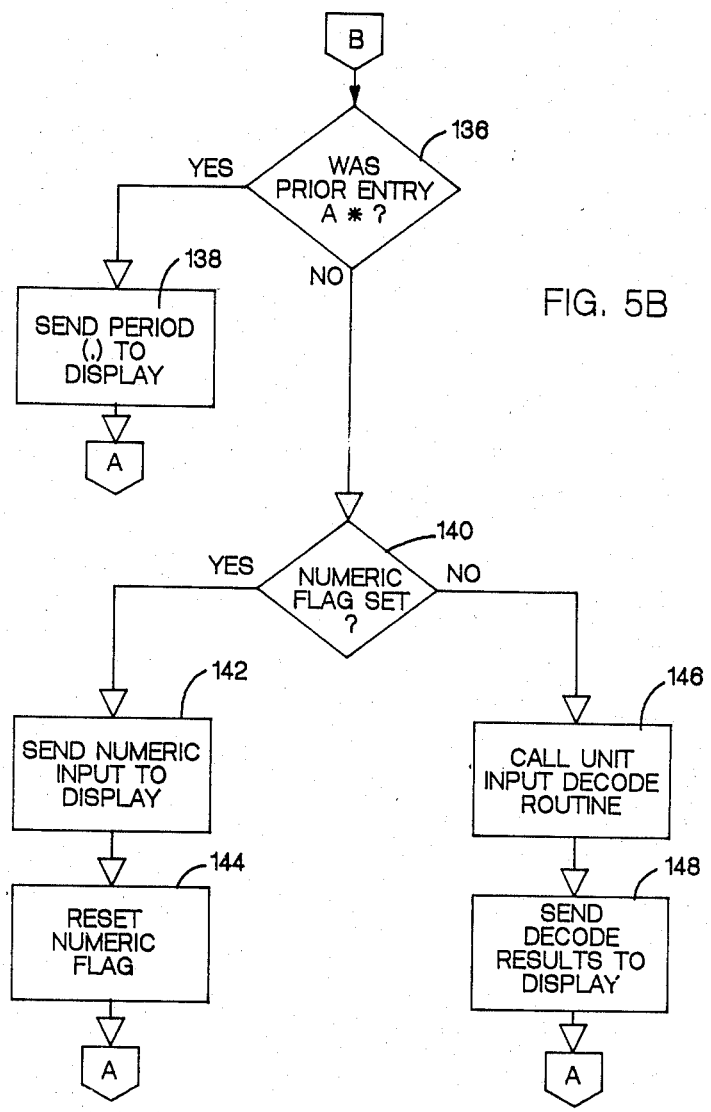

FIG. 5 is a more detailed flow chart of the steps which are performed in the data entry and input unit assembly operations. Again assuming that the necessary telephone connections have been made and that user B understands the system well enough to begin entering data, processor 10 accepts individual input signals from the tone decoder (block 110) and checks to see whether the signal represents a valid telephone tone (block 112). When a valid tone is found, a determination is made (block 114) as to whether one of the 1 through 9 keys was detected. If so, the number is added (block 116) to an input string, which is a string of all keypad entries which have occurred since the last "*" character or, for the initial string, from the start of data entry.

If the key detected was not one of the 1 through 9 keys, a determination is made whether the detected key was the "*" key (block 118). If the detected key was not the "*" key, another determination is made (block 120) as to whether it was the "#" key. Assuming it was not, the detected key could only have been the 0 or Operator key. Since this key is a multi-function key, a subsequent determination (block 122) must be made to determine whether a numeric flag had been previously set. The manner in which the numeric flag becomes set was described briefly with reference to FIG. 3 and will be discussed again in the following material. Assuming the numeric flag is found to have been set, the system interprets the 0 key entry as the number 0 and appends it to the input string, which is assumed to represent a numeric rather than word sequence. If, however, the numeric flag is not found to be set, the 0 key entry is interpreted as a request for help by user B. A help function is invoked (block 124). As discussed earlier, the help can be provided in the form of prerecorded or synthesized oral instructions to be transmitted to user B.

If the check is made in block 120 showed that the detected key was the "#" key, another check is made (block 128) as to whether the detected "#" key is the first key entry in the message. If it was, a numeric sequence flag is set (block 134) to indicate that subsequent key entries are to be interpreted as numbers rather than words. If the determination at block 128 indicates that the detected "#" key was not the first message character, a determination must then be made (block 130) as to whether it was preceded by a detected "*" key. If the "#" key was preceded by a "*" key, the numeric sequence flag is still set since the "#" key is interpreted to mean that a numeric sequence is being entered following an earlier word-identifying sequence.

If, however, the determination at block 130 showed that the prior entry was not a "*" key entry, that is, that the "#" key was entered in the middle of a keypad sequence, then the "#" is interpreted as an erase request. The system responds by erasing all key entries back to the next earlier "*" entry. User B then re-enters the correct keypad sequence.

The operations described above are repeated with entries being appended to the input string until the check at block 118 indicates "*" entry has been made to delimit a number or word identifying sequence. The complete sequence forms an input unit. A check must then be made (block 136 in FIG. 5B) to see whether the just entered "*" was preceded by another "*" entry, signifying the end of a sentence. If not, a further check is made (block 140) to see whether the numeric flag has been set. If the numeric flag is set, the input unit is interpreted as a number sequence, which is sent directly to the display (block 142) without need for interpretation. When the number sequence has been sent to the display, the numeric sequence flag is reset (block 144) and the program return to the beginning block 110 in the data entry steps.

If the check at 140 shows the numeric sequence flag had not been set, the input unit is assumed to be a word identifying one, which must be interpreted using a decoding routine (block 146). Preferred decoding routines are described later with reference to FIGS. 6 and 7. When the decoding routines have been completed, one or more words are returned for presentation to the display screen (block 148). The program again returns to the beginning block 110.

If the check made at block 136 indicated that two "*" characters had been entered in succession, the second "*" character is interpreted as an end of sentence delimiter. A period (.) is presented to the display (block 138) to mark the end of the entered sentence.

Unlike prior art techniques which required a user to press multiple keys to identify exactly which alphabetic character was intended, the present invention requires only that the user press a single key. The decoding routines determine which words were most probably intended by the user.

Figure 6:
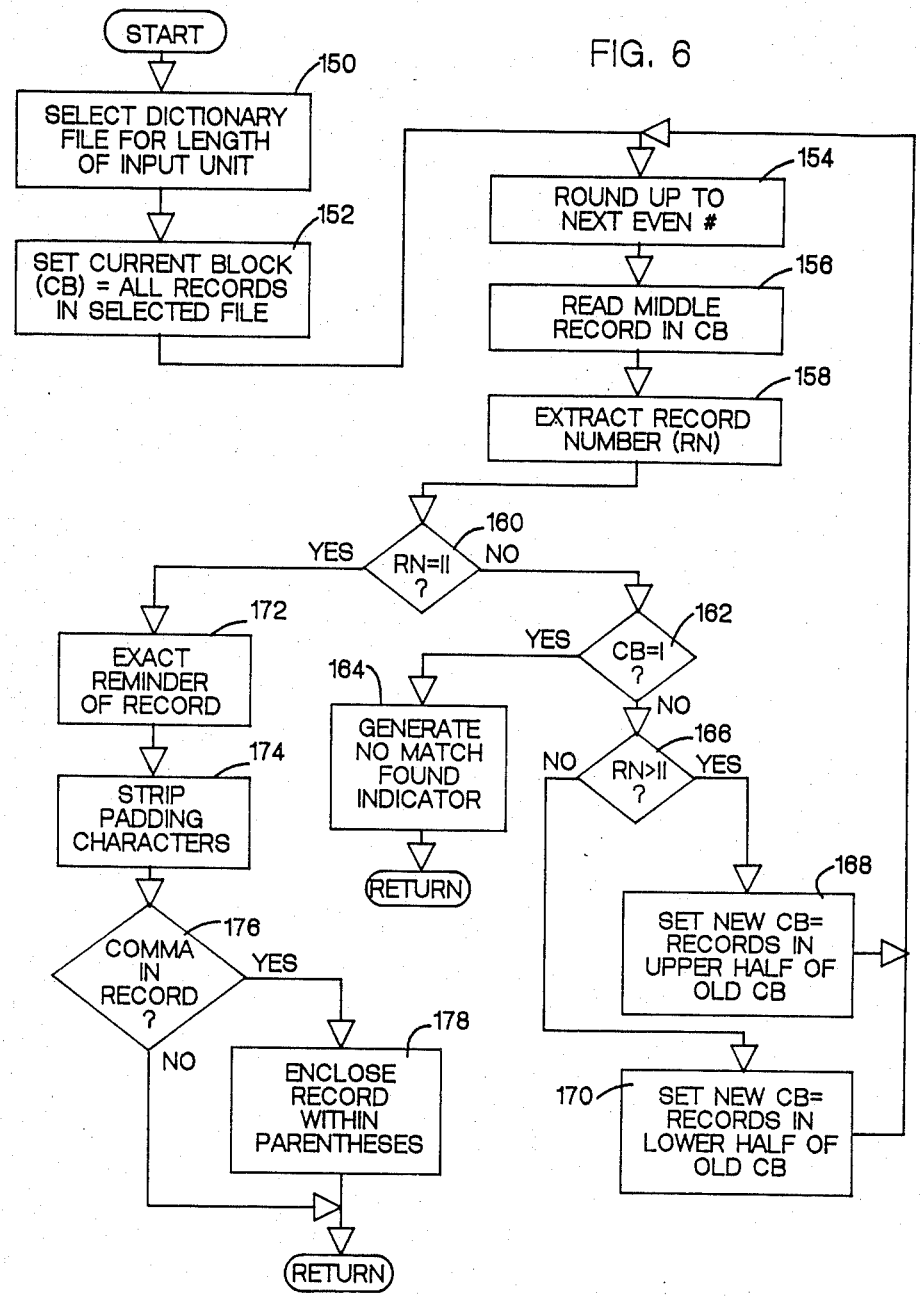
FIG. 6 is a flow chart of one embodiment of an input unit decoding operation.

FIG. 6 describes a preferred decoding routine. The routine utilizes a plurality of on-line dictionaries or databases, each of which contains words of a particular length. For example, all five letter words are stored in one database, all six letter words are stored in another database, etc. In each database, words which might be represented by a particular keypad sequence are stored in records which include those sequences. Preferably, fixed length records on the order of 40 bytes are used. An example of a record in a database for four letter words is as follows:

3282,data,daub,xxxxxxxxxxxxxxxxxxxxxxxxxx wherein "3282" is the record number, which is also the input unit which would be used to represent either "data" or "daub". The x's represent padding characters or blanks required to fill out the fixed length record. If any other words could be spelled out by the "3282" keypad sequence, they would be added to this record.

The operation of retrieving words represented by input units begins with selection (block 150) of the database or dictionary file having words of the same length as the input unit being decoded. A current block indicator is set (block 152) equal to the actual number of records in the selected file. The number is rounded up (block 154) to the next higher even number if necessary in preparation for a binary search operation. The middle record in the current block is read (block 156) and the record number is extracted (block 158) for comparison (block 160) to the input unit being decoded. Unless the record number and the input unit are the same, a check is made (block 162) to determine whether the current block size is equal to one, indicating that the binary search operation has been completed. If the binary search operation has been completed without finding a record number matching the input unit, a "no match found" indicator is generated (block 164) and control is returned to the main program.

If the binary search operation is incomplete, a determination is made (block 166) whether the accessed record number is greater than the input unit. If it is, the block of records still to be accessed is set equal to the records in the upper half (block 168) of the old block. If the accessed record number is less, the current block is redefined as the records in the lower half (block 170) of the old block.

The binary search steps beginning at block 154 are repeated until the search operation is completed or until the determination at block 160 indicates an accessed record number equal to the input unit. If a match is found, the remainder of the record (that is, the stored word or words) is extracted (block 172), padding characters or blanks are stripped (block 174) and the record is examined (block 176) to see if it includes a comma.

The presence of a comma indicates that more than one word is stored in the record. The words in the record are enclosed within parentheses (block 178) before the record entry is returned to the main program for presentation on the user's display. If a single word is found in the record, no parentheses are used.

Contrary to what might be expected, there are relatively few words which are identified by the same keypad sequence. Where two or more words are identified by the same keypad sequence, experience has shown that the word most probably intended is usually easily chosen based on the context of the sentence in which it appears.

Figure 7:
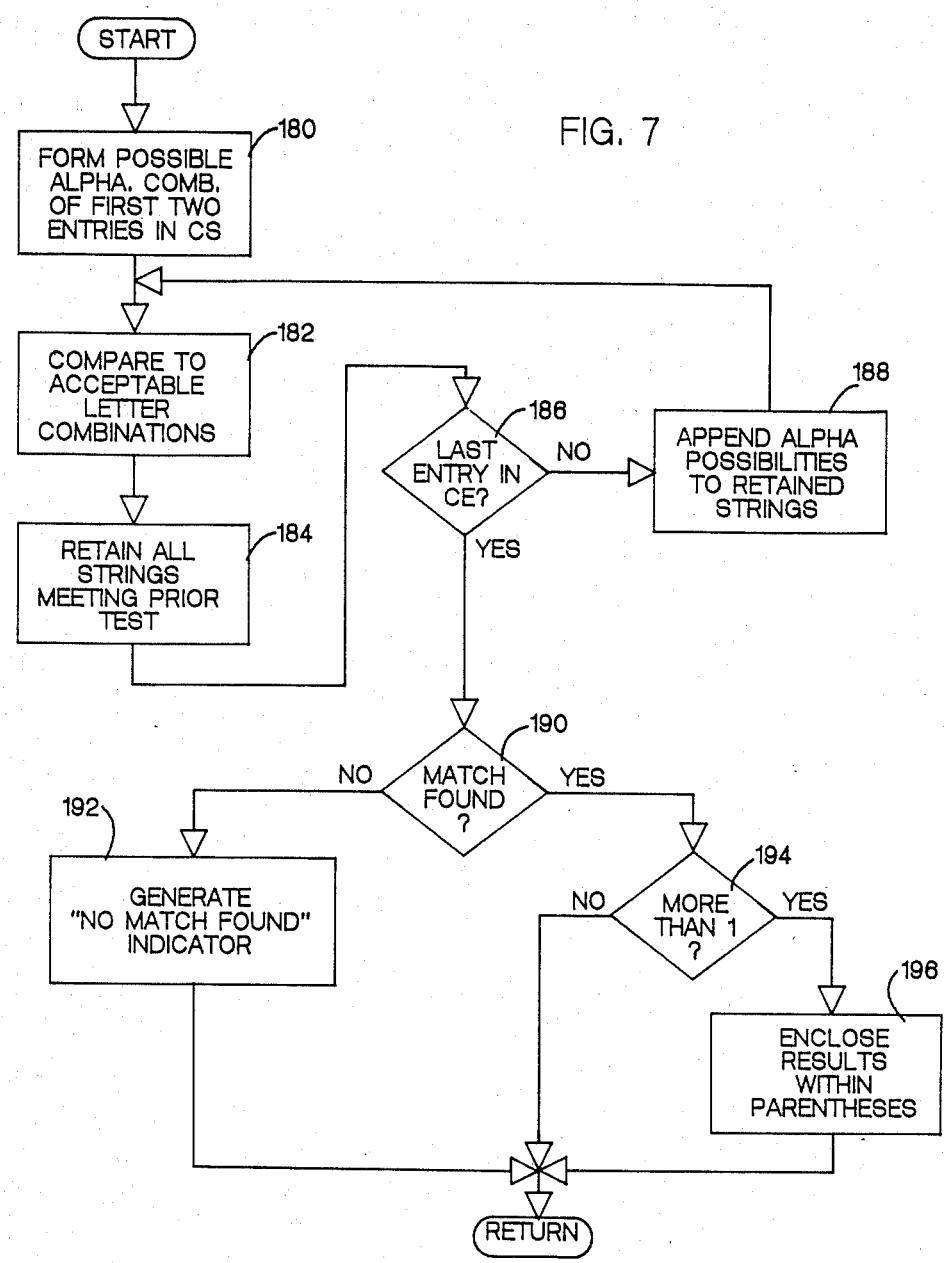
FIG. 7 is a flow chart of an alternate embodiment of an input unit decoding routine.

FIG. 7 shows an alternate approach to decoding current strings of keypad entries. This approach makes use of the characteristics of on-line spell checking programs widely available for word processing programs. All possible combinations of the alphabetic letters of the first two keys in the input unit are formed (block 180). For example, if the first two key entries in the sequence are the "5" and the "6" keys, the possible alphabetic combinations are JM, JN, JO, KM, KN, KO, LM, LN and LO. These combinations are compared to acceptable letter pairs (block 182) and only acceptable combinations are retained (block 184).

A check is made (block 186) to see if there are more characters in the input unit. If there are remaining characters, the alphabetic possibilities for the next character are added to the retained combinations (block 188) and the check for acceptable letter combinations is repeated.

When the last character in the current string has been entered and unacceptable combinations have been deleted, a check is made (block 190) to see if at least one word remains. If none remains, a "no match found" indicator is returned to the main program. If at least one word remains, a check is made (block 194) to see if more than one remains. If more than one word does remain, the words are set off by commas and enclosed within parentheses (block 196) before being returned to the main program. If only a single word is found, it is returned directly to the main program without the parentheses.

While there have been described what are considered to be preferred embodiments of the invention, variations and modifications therein may occur to those skilled in the art once they are made aware of the basic inventive concepts. Therefore, it is intended that the appended claims shall be construed to include both the preferred embodiments and all such variations and modifications as fall within the true spirit and scope of the present invention.

I claim:

1. A system for locally presenting to a human user an alphanumeric message comprising a sequence of words received over a telephone line as a series of tone signals entered through the keypad of a remote telephone dialing device, comprising:
   - memory means comprising an addressable database of words;
   - means for converting received tone signals into electrical signals, each electrical signal representing the activation of either a numeric key or a control character key on the keypad, each numeric key signal representing a single alphabetic character or number;
   - means for assembling the electrical signals into a series of input units, each input unit consisting of one or more numeric key signals followed by a control key signal and representing one word in the sequence of words;
   - means for sequentially addressing the database to retrieve any word or words stored therein at the location identified by each input unit; and
   - means for locally outputting the message by presenting the retrieved words in a sequence corresponding to the input unit series and in a form perceptible to the human user of the system, said last named means identifying and presenting multiple words stored in any such location to permit the human user to select the most appropriate of the multiple words from the sequential context in which it is presented.

2. The system as defined in claim 1 further including means responsive to a predetermined sequence of control key signals for sending an input unit to the presenting means in the form of a sequence of one or more numbers without addressing the database.

3. The system as defined in claim 2 wherein the presenting means comprises a video monitor.

4. The system as defined in claim 2 further including means responsive to a different predetermined sequence of control key signals for sending an end-of-sentence indicator to the presenting means.

5. A method of locally presenting to a human user an alphanumeric message comprising a sequence of words based on tone signals received over a telephone line, said signals having been entered on the keypad of a remote tone-generating telephone dialing device, said method comprising the steps of:
   - converting the received tone signals into electrical signals, each electrical signal representing the activation of either a numeric key or a control character key on the keypad, each numeric key signal representing a single alphabetic character or number;
   - assembling the electrical signals into a series of input units, each input unit consisting of one or more numeric key signals followed by a control key signal and representing one word in the sequence of words;
   - sequentially accessing a database of stored words to retrieve any word or words stored therein at the location identified by each input unit; and
   - locally outputting the message by presenting the retrieved words in a sequence corresponding to the input unit series and in a form perceptible to the human user with multiple words stored at a location being identified and presented to permit the human user to select the most appropriate of the multiple words from the sequential context in which it is presented.

6. The method as defined in claim 5 including the additional step of responding to a predetermined sequence of control key signals by presenting the numeric representation of an input unit without performing the step of accessing a database.

7. The method as defined in claim 6 including the additional step of responding to a different predetermined sequence of control key signals by presenting an end-of-sentence indicator without performing the step of accessing a database.

8. A system for locally presenting to a human user an alphanumeric message comprising a sequence of words received over a telephone line as a series of tone signals entered through the keypad of a remote tone-generating telephone dialing device, said system including:
   - one or more databases of words, said words being arranged in records and each record including a numeric record number;
   - means for converting received tone signals into electrical signals, each electrical signal representing the activation of either a numeric key or a control character key on the keypad, each numeric key signal representing a single alphabetic character or number;
   - means for assembling the electrical signals into a series of input units, each input unit consisting of one or more numeric key signals followed by a control key signal and representing one word in the sequence of words;
   - means for addressing said one or more databases using the input units serially as addresses to locate records having numeric record numbers matching the input units;
   - means for locally outputting the message by serially presenting words stored in any such records in a sequence and in a form perceptible to the human user of the system, said last-named means identifying and presenting multiple words having the same numeric record number to permit the human user to select the most appropriate of the multiple words from the sequential context in which it appears.

9. The system as defined in claim 8 further including means responsive to a predetermined sequence of control key signals for sending an input unit to the presenting means in the form of a sequence of one or more numbers without addressing a database.

10. The system as defined in claim 9 further including means responsive to a different predetermined sequence of control keys for sending an end-of-sentence indicator to the presenting means.

11. For use in a system having one or more databases of words stored in records with each record including a numeric record number, a method of locally presenting to a human user an alphanumeric message comprising a sequence of words based on tone signals received over a telephone line, said signals having been entered on the keypad of a remote tone-generating telephone dialing device, said method comprising the steps of:

converting the tone signals into electrical signals, each electrical signal representing the activation of either a numeric key or a control character key on the keypad, each numeric key signal representing a single alphabetic character or number;

assembling the electrical signals into a series of input units, each input unit consisting of one or more numeric key signals followed by a control key signal and representing one word in the sequence of words;

serially accessing said one or more databases to locate any record having a numeric record number matching each input unit;

retrieving any word or words stored in the accessed records; and locally outputting the message by presenting the retrieved words in a sequence corresponding to the input unit series and in a form perceptible to the human user with multiple words stored in any such record being identified and presented to permit the human user to select the most appropriate of the multiple words from the context in which it is presented.

12. The method as defined in claim 11 including the additional step of responding to a predetermined sequence of control key signals by presenting the numeric representation of an input unit without performing the step of accessing a database.

13. The method as defined in claim 12 including the additional step of responding to a different predetermined sequence of control key signals by presenting an end-of-sentence indicator without performing the step of accessing a database.

* * * * *